United States Patent [19]
Ringelheim, deceased et al.

[11] 3,862,504
[45] Jan. 28, 1975

[54] VISUAL DISPLAY APPARATUS

[76] Inventors: Harry M. Ringelheim, deceased, late of P.O. Box 1016, Pittsburg, Pa. 99574; Shirley R. Bleiberg, executrix; John J. Jason, 21165 Escondido St., Woodland Hills, Calif. 91364

[22] Filed: Apr. 26, 1972

[21] Appl. No.: 247,869

[52] U.S. Cl. ............................. 40/106.53, 40/137
[51] Int. Cl. ....................... G09f 13/34, G09f 19/14
[58] Field of Search...40/106.51–106.53, 137, 30, 36

[56] References Cited
UNITED STATES PATENTS

| | | | |
|---|---|---|---|
| 2,173,939 | 9/1939 | Hall | 40/106.52 |
| 3,000,125 | 9/1961 | Elvestrom | 40/137 |
| 3,082,560 | 3/1963 | Elvestrom | 40/137 |
| 3,683,525 | 8/1972 | Fukui | 40/137 |

FOREIGN PATENTS OR APPLICATIONS 1,185,129  2/1959  France ................................ 40/137

*Primary Examiner*—Robert W. Michell
*Assistant Examiner*—John F. Pitrelli
*Attorney, Agent, or Firm*—Arnold B. Silverman

[57] ABSTRACT

A housing having a display opening provided with a curved transparent display window secured within or adjacent to the opening. A composite transparency having at least two pictures with each picture fragmented into a plurality of stripe-like picture segments disposed in spaced relationship with respect to each other and in abutting alternating relationship with respect to picture segments of at least one other picture. A shutter member having darkened sectors which prevent picture display and transparent sectors which permit picture display. The stripe-like picture segments of the transparency having a height greater than the height of the transparent sectors of the shutter. The transparency and the shutter are disposed in intimate face to face contacting relationship adjaent the display window in relative registered position to permit sequential display of the transparency pictures through the display window. Drive means for establishing relative movement between said shutter and said transparency while retaining the curved intimate surface to surface contact therebetween to permit sequential independent display of the pictures. Cam means operatively associated with either the shutter or the transparency. Anchoring means provided on either the shutter or the transparency.

Audio means for operation simultaneously with the picture display and coordinating means for synchronizing the operation of the audio means with the display of the transparency pictures.

Display subsystems having independent display assemblies. The housing may have more than one display window. Means for transporting the display subsystems into and out of alignment with the display window or windows.

10 Claims, 22 Drawing Figures

PATENTED JAN 28 1975 3,862,504

VISUAL DISPLAY APPARATUS

BACKGROUND OF THE INVENTION

1. Field of the Invention

This invention relates to an improved form of visual display assembly for accurately and clearly sequentially displaying pictures from a composite transparency. More specifically, this invention provides means for effectively controlling the clarity of display presentation and increasing the total number of pictures which may be provided within a single housing, in addition to providing for improved ease of interchangeability of transparencies.

2. Description of the Prior Art

It has frequently been desired to provide a single photographic transparency which is a composite of two or more pictures assembled in such a fashion that the use of an appropriate shutter member to mask all but one of the pictures permits sequential display of more than one photograph from a single transparency. In practice, such transparencies have each picture divided into a number of stripe-like segments which are spaced from each other. Each picture has its spaced stripe-like segments disposed in alternating relationship with respect to stripe-like segments of the other pictures. As a result, a mask which is provided with transparent portions having generally the same spacing as the stripe-like segments of a single segmented transparency picture and darkened regions therebetween permits viewing of only a single picture at one time. If the stripe-like picture segments are of sufficient number, the viewer is not aware of the fact that he is seeing only segments of a given photograph as opposed to the entire photograph. See, for example, U.S. Pat. Nos. 1,460,674, 2,618,087 and 3,082,560.

Among the problems which have interfered with commercial adoption of the prior systems is the inability to obtain precise alignment between the transparent mask elements and the stripe-like picture segments, as well as the inability to provide for refined precision relative movement between the transparency and mask to avoid undesired picture distorting overlap.

U.S. Pat. No. 1,460,674 discloses a method for simulating animated action by creating rapid relative reciprocating movement between a transparency and a screen. As a result of this disclosure not being concerned about a prolonged dwell time and a clear representation of an individual picture during this dwell time, the somewhat primitive mechanical operating means and leaf spring retention might have been suitable within that context, but would be inadequate for one seeking maximum clarity of individual pictures during prolonged exposure and sequential viewing of each of the pictures.

U.S. Pat. No. 3,082,560 discloses a method of seeking to improve clarity through avoidance of undesired overlap of independent pictures. This approach involves the use of void regions between adjacent picture segments. Such voids, however, in view of the absence of high precision mechanical controls and alteration of transparency dimensions under the influence of varying thermal conditions and the like would lead to undesired intermittent gaps in the display picture as viewed through the display window. U.s. Pat. No. 2,618,085 discloses a system for integrating a plurality of pictures as a result of individual segments which are each contained on separate electric lamps being visually integrated by the eye. Such a system does not provide the benefits of a single precisely established composite transparency.

In addition to the above-described inadequacies in terms of the absence of precise mechanical control and lack of unity and clarity of picture, there remains a need for such a structure which is so constructed as to facilitate ready interchangeability of transparencies by the customer or end user, as opposed to requiring the services of a skilled or semi-skilled technician. In addition, as such display assemblies have primary utility in connection with advertising and promotional uses, the system must be such as to be constructed and maintained in a sufficiently economical manner to remain competitive with other known types of promotional display systems.

There remains a further need for systems meeting the foregoing requirements and, in addition, providing for a greater number of total pictures which can be displayed within a single housing and also permitting complementary auido background including messages which may be coordinated with the visual display.

SUMMARY OF THE INVENTION

The visual display assembly of the present invention has solved the above-described problems as a result of the unique features which will be described hereinafter in greater detail.

The visual display assembly provides a housing having a display opening which has a curved transparent display window secured within or adjacent the display opening. A composite transparency having at least two pictures fragmented into a plurality of stripe-like picture segments of substantially uniform height is provided. The stripe-like picture segments of one picture are disposed in spaced relationship with respect to other segments of the same picture and are disposed in abutting alternating relationship with respect to picture segments of the other pictures. A shutter member has darkened sectors which prevent picture display therethrough disposed in alternating position with respect to transparent sectors which permit picture display therethrough. The transparency and shutter are disposed in curved intimate face to face contact adjacent the display window in relative registered position to permit sequential display of one picture at a time. Drive means are employed to establish registered relative movement between the shutter and transparency while maintaining the curved intimate surface to surface contact therebetween and permitting sufficient dwell time for desired display of each individual transparency picture. Cam means mechanically coordinate the rotational movement of the driving motor with the generally reciprocating movement of either the shutter or transparency. A source of diffused light is provided rearwardly of the transparency and shutter.

In one form of the invention at least two display subsystems are provided within the housing to permit the display of an increased number of different pictures and/or viewing of the pictures from more than one side of the housing. In one embodiment of the multiple viewer systems, the housing is rotated to permit complete display to positions on all sides of the housing. In another embodiment of the invention, the number of viewing subsystems is greater than the number of windows and the subsystems are moved into and out of viewing alignment with the display window.

Audio means for providing complementary audio background which may be synchronized with the sequential picture display may be provided.

It is an object of this invention to provide an automated visual display assembly which permits precisely controlled sequential display of a number of pictures provided on a single composite transparency.

It is another object of this invention to provide such a visual display assembly which eliminates distortion resulting from either overlap of or gaps between adjacent transparency picture segments as well as thermal expansion of either the transparency or the shutter to effect relative misalignment therebetween.

It is another object of this invention to provide such a visual display system which facilitates ready interchangeability of composite transparencies by one unskilled in the technical aspects of the viewer. It is another object of this invention to provide an economical means of obtaining precisely controlled sequential display of the pictures on more than one composite transparency within a single visual display assembly housing by means of the use of multiple display subsystems and, in some instances, more than one visual display window.

It is a further object of this invention to provide means for coordinated presentation of audio background or messages with respect to the visual display of the transparencies.

These and other objects of the invention will be more fully understood from the following description of the invention, on reference to the illustrations appended hereto.

DESCRIPTION OF THE PREFERRED EMBODIMENTS

Figure 1:
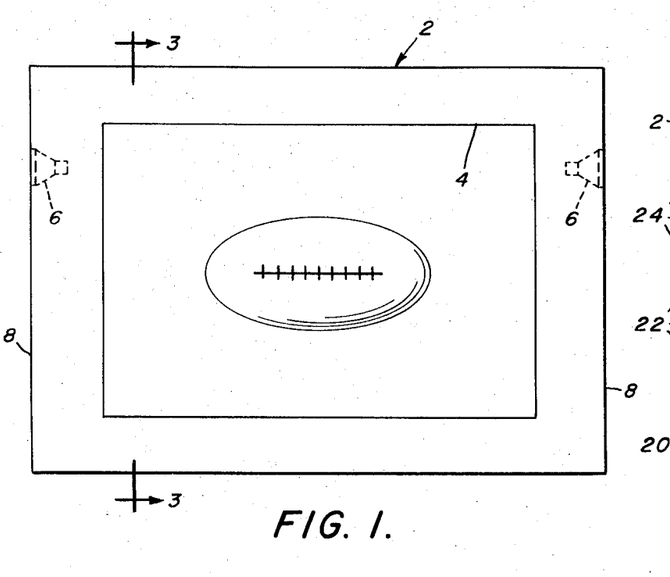
FIG. 1 is a partially schematic front elevational view of a form of visual display assembly of this invention.
Figure 2:
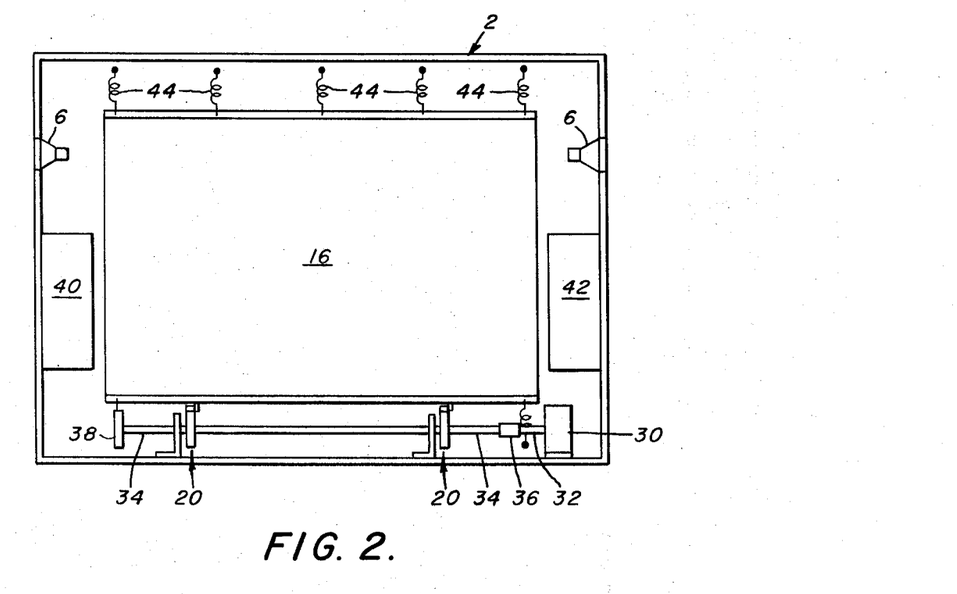
FIG. 2 is a partially schematic rear elevational view of the visual display assembly of FIG. 1, with no rear cover being shown.
Figure 3:
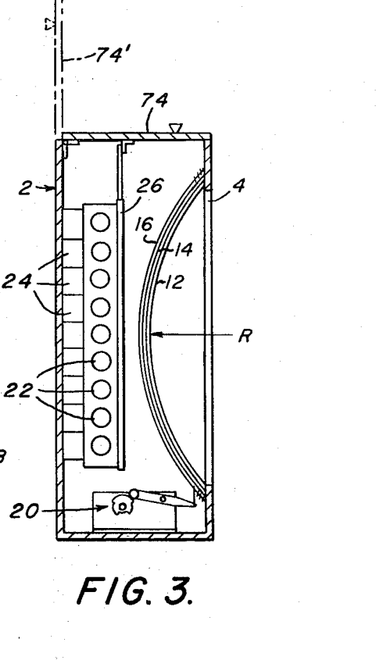
FIG. 3 is a cross sectional view of the visual display assembly of FIG. 1 taken through 3—3 of FIG. 1.

Referring now more specifically to FIGS. 1 through 3, some of the structural features of the invention will now be considered. As is shown in FIG. 1, the visual display assembly has a housing or cabinet 2 provided with a display opening 4 through which one may observe the transparency pictures. The housing 2 may conveniently be made of wood, plastic, metal or combinations thereof. Also shown in FIG. 1 are a pair of audio speakers 6 which for convenience of illustration have been shown secured to the sidewalls 8 of the housing 2.

Figures 4, 4A, 5, 6:
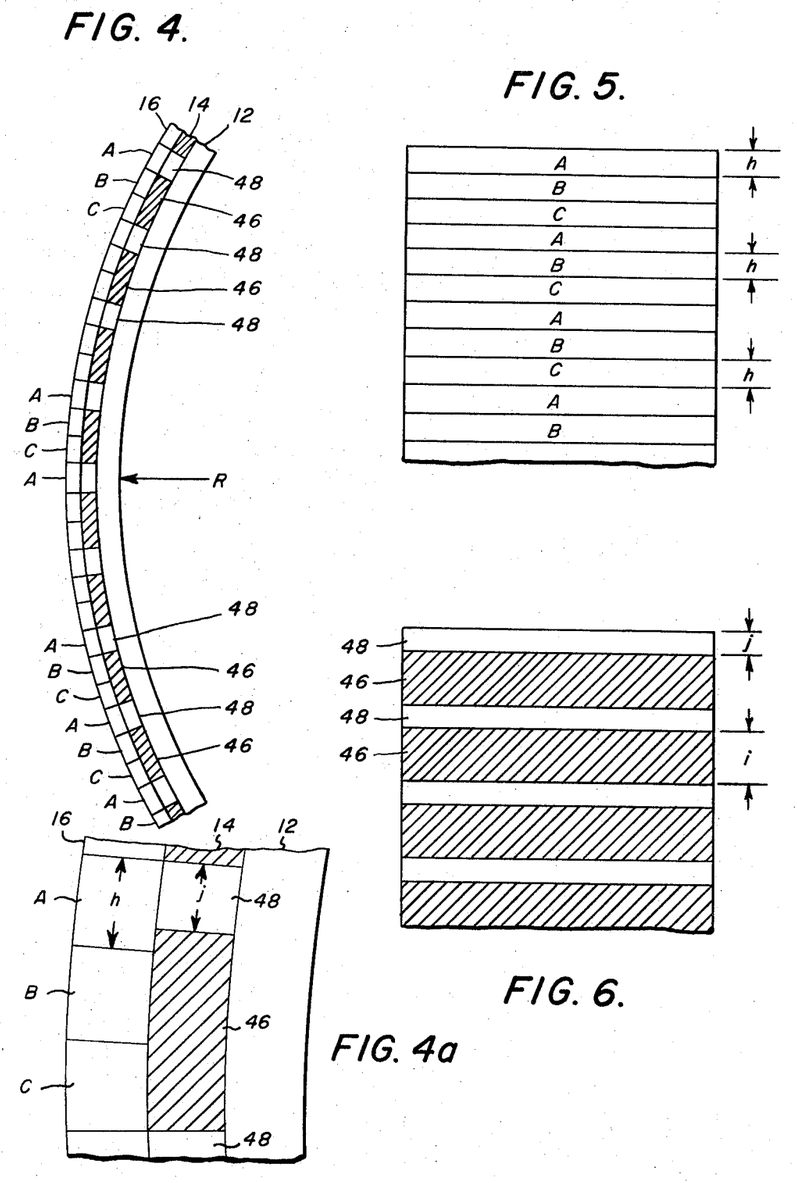
FIG. 4 is a partial sectional view showing one form of window, shutter and transparency relationship of this invention.
FIG. 4a is an enlarged, fragmentary view of a portion of FIG. 4 illustrating an exemplary height relationship between portions of a shutter and transparency.
FIGS. 5 and 6 are partial views of a transparency and shutter, respectively, of this invention.

As is shown in FIGS. 3 and 4, disposed either within or immediately adjacent the display opening 4 are a transparent display window 12, a shutter 14 and composite transparency 16. The window 12 may be composed of any transparent substantially distortion free element such as a plastic or glass material. Plexiglass, having a thickness of about one-eighth to two-eighths inch, has been found to be a suitable economical material for this use. The shutter 14 and composite transparency 16 which will be described in greater detail below are preferably made of photographic film-like materials and are in intimate surface to surface engagement with each other, preferably with the emulsion faces in contact with each other. The shutter 14 is in surface to surface contact with the window 12 in the form shown.

It is noted that the display window 12 is outwardly concave and has a radius R. As a substantially flat window can contribute to distortions in the picture display, it is preferred that the window 12 be provided with a least a slight outwardly concave curvature, but not so great as to distort the visual impression which the viewer receives. For example, for a window of about 20 × 24 inches, the radius of curvature might be about 45 to 60 inches. It has been found that the curvature of the window 12 and resultant curvature of shutter 14 and composite transparency 16 contribute substantially toward effecting the desired relative registered position between the shutter 14 and the composite transparency 16. The curvature also contributes substantially to registered relative movement between the shutter 14 and transparency 16 in order to provide a clear display of each independent picture on the transparency.

Referring once again to FIG. 3, there is shown a form of cam assembly 20 which contributes substantially to controlled indexed relative movement between the shutter 14 and composite transparency 16. In the form shown in FIGS. 3 and 4, it is contemplated that the transparency 16 will be subjected to relative movement and the shutter 14 will remain stationary. The shutter and window 12 may be secured to the housing by any suitable means which immobilizes them. Means for adjusting the window and shutter positions and locking the same may be provided.

Positioned rearwardly of the shutter 14 and transparency 16 is a bank of electric lamps 22 which, in the form shown, are fluorescent bulbs, preferably of the daylight variety, which are provided with suitable ballast starters 24. A light diffuser 26 which may conveniently be a clouded plastic or glass sheet is secured between the lamps 22 and the composite transparency 16. This serves to provide more uniform lighting of the transparency and provide a better visual display image.

Referring now to FIG. 2, there is shown an electric motor 30 which has an output shaft 32 joined to camshaft 34 by means of coupling 36. In the form shown, two sets of cam means 20 are secured to camshaft 34 to convert the motor's rotational movement into relative vertical reciprocating translational movement of the transparency 16. An audio synchronization cam 38 is also secured to camshaft 34. This cam 38 serves to operate an electrical switch (not shown in this view) in order to initiate and terminate a coordinated audio message with the sequential display of the transparency pictures. Means for presenting a prerecorded audible program in the form of a tape player 40 is shown in FIG. 2. An audio amplifier 42 is also provided. A number of transparency anchoring tension coil springs 44 are shown secured to the upper and lower edges of the transparency and to the housing.

Referring now to FIG. 4 there is shown the transparency 16, shutter 14 and window 12 in curved face to face contacting relationship. The transparency 16 consists of three pictures. The stripe-like picture segments for a first picture are represented by the letter A, for the second picture by the letter B and for the third picture by the letter C. It will be appreciated that the stripe-like segments for picture A are disposed in generally uniformly spaced relative position with respect to each other, but are in alternating position with respect to the elements of pictures B and C. It will further be appreciated that the shutter 14 has alternate dark sectors 46 which are adapted to resist display of a transparency picture therethrough and transparent sectors 48 which permit display of a transparency picture therethrough.

In the transparency-shutter position illustrated in FIG. 4, the diffused light will cause segments A to be visible through the display window 12, but segments B and C will not be visible. After the desired period of exposure of picture A, the transparency will be subjected to relative upward movement, in a manner to be described below, in order to align the stripe-like segments of picture B with transparent sectors of shutter 14. In this position, sectors A and C will be adjacent dark sectors 46 of shutter 14 and cannot be seen. Subsequently, the transparency 16 is moved upwardly to align the picture segments C with the transparent sectors 48 and the third picture will be displayed. After completion of display of the C picture segments the cycle may be reversed or re-initiated. In the former instance, after the C pictures are shown, B and then A would be shown. In the latter instance, after exposure of the C pictures, picture A would be shown followed by the remaining pictures in sequence. Where there is no preferred particular sequence of display, it is preferred to use the A-B-C-B-A cycle as it is easier to maintain precise alignment with the short return steps (C-B-A) as opposed to the larger return (C-A). Regardless of the sequence selected, the cycle may be repeated automatically for prolonged periods of time.

Referring now to FIGS. 4a, 5 and 6, an important aspect of the invention which has a meaningful contributing relationship to the clarity of picture presentation and avoidance of undesired picture overlap or gaps between successive frames of the picture will be considered. In FIGS. 4a, 5 and 6 there are shown a transparency having three different pictures and a shutter adapted for use with the same. The transparency stripe-like picture segments which bear the designations A, B and C are of substantially uniform height from end to end and are of substantially equal height with respect to each other. As is shown in FIGS. 4a and 5, the stripe-like picture segments each have a height $h$.

Referring now to FIGS. 4a and 6, the dark sectors 46 of the shutter have a height $i$ which is greater than height $h$. The light transparent sectors 48 of the shutter have a height $j$ which is less than the height $h$. In a preferred form, height $h$ exceeds height $j$ by about 15 to 60 percent, with about 20 to 55 percent being the preferred range. As a result of this relative proportionality of heights, should there be any alteration in dimensions of the shutter 14 or transparency 16 as a result of thermal expansion or contraction or other means, the sectors A, B and C would nevertheless not be of lesser height than transparent sectors 48. This prevents undesired establishment of relative overlap, as by a portion of a B sector entering the A display picture by being displayed therewith. Finally, it is preferred that segments A are disposed in adjacent abutting relationship with sectors B so as to preclude the existence of a gap therebetween. Similarly, adjacent sectors B and C and adjacent sectors C and A are in abutting relationship.

An example of how the structure of FIGS. 5 and 6 is employed in a three picture composite transparency would be to provide each of the stripe-like picture segments A, b, C in a height of about 0.025 inch with the transparent shutter section 48 having a height of about 0.020 inch. The dark sector 46 would have a height of about 0.055 inch. An example of how this structural relationship might be employed in connection with a five picture transparency will also be considered. The stripe-like picture segments may be provided with a height of 0.015 inch with the transparent sections 48 having a height of 0.010 inch and the dark sectors 46 have a height of 0.065 inch.

It will be appreciated that in the three picture transparency approximately one-third of each original picture is present in the composite and in the five picture transparency approximately one-fifth of each original picture is present in the transparency. It is the small height of the individual stripe-like picture segments A, B, C which results in preservation of the overall appearance of the picture and the absence of the appearance of a clipped or edited version.

Figure 7:
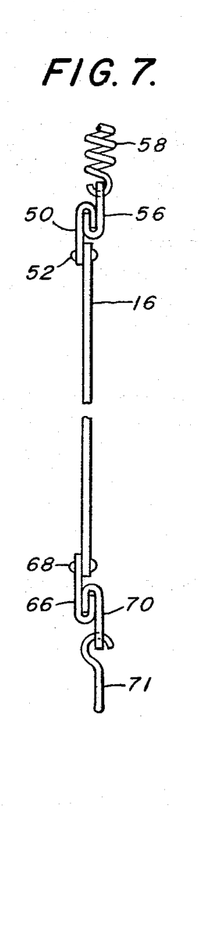
FIG. 7 is a partially schematic cross sectional view showing one form of shutter or transparency anchoring system contemplated by this invention.

Referring now to FIG. 7, an example of how the movable element of the shutter-transparency combination (either the shutter 14 or composite transparency 16) might be anchored will be considered. For purposes of convenience of interchangeability it is preferred to sandwich the shutter 14 between the display window 12 and the composite transparency 16, with the transparency 16 being movable. If desired, however, one might readily obtain the other benefits of this invention by placing the transparency 16 between shutter 14 and display window 12, with the shutter 14 being subjected to relative movement. In FIG. 7 the transparency 16 is the movable element and is shown as being provided with an upper anchoring element 50 which takes the form of a generally J-shaped elongated member with a downwardly open channel. Anchoring element 50 is secured to the transparency by a suitable fastener element 52 such as a rivet. If desired, adhesive means, tape or other suitable means for securing the anchor element 50 in relative fixed position with respect to transparency 16 may be employed in lieu of or in addition to the fastener element. An elongated generally J-shaped anchoring clip 56 is mechanically interengaged with anchoring element 50. Tension coil spring 58 has one end secured to anchoring clip 56 and the other end secured to the housing. This serves to urge the transparency 16 upwardly and maintain the same under slight tension as a result of the cooperative action of the lower anchoring means. Lower anchoring element 66 is an elongated J-shaped member having an upwardly open channel. In the form shown, anchoring element 66 is secured to transparency 16 by means of a fastener element in the form of rivet 68. A lower anchoring clip 70 is also elongated and has a generally J-shaped profile. Lower anchoring element 66 is secured to the same face of the transparency as is the upper anchoring element 50. This lower anchoring clip 70 is mechanically interengaged with lower anchoring element 66 and in the particular section shown has its lower end secured to the free end of cam arm 72 by means of cam link element 71 (see FIG. 10). The anchoring elements 50, 66 and anchoring clips 56, 70 are preferably made from a relatively rigid, corrosion resistant, durable material such as aluminum or stainless steel, for example.

Coil springs (not shown in this view) urge the lower anchoring clip downwardly. It will be appreciated that a transparency 16 may be readily installed by even an unskilled individual. Lower anchoring element 66 is mechanically engaged with lower anchoring clip 70. The composite transparency 16 is then raised against the tension of the lower coil springs (not shown in this view) until upper anchoring element 50 can be interengaged with anchoring clip 56. This serves to establish a tight surface to surface curved engagement between the transparency 16, which is in tension, and the adjacent shutter 14.

Referring now to FIG. 3, it is seen that the housing 2 has a hinged upper door 74 which is adapted to be moved from the position indicated to the phantom position 74' in order to provide access for changing the composite transparency. This facilitages ready access for changing transparencies.

Figure 8:
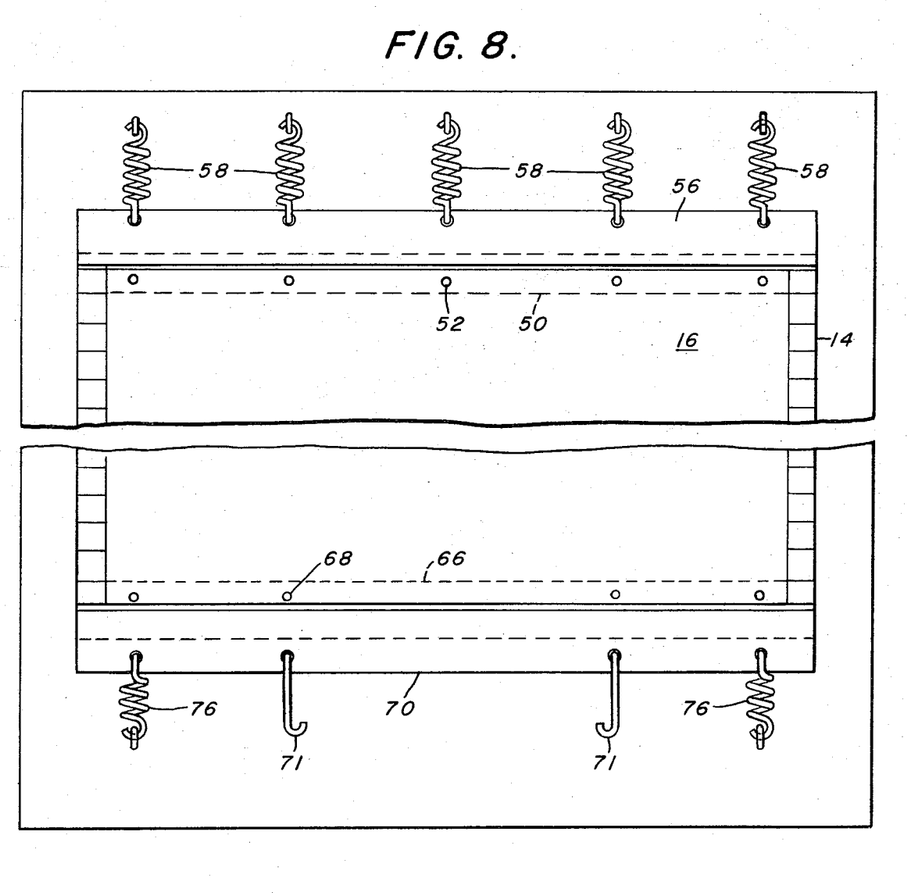
FIG. 8 is a schematic rear view showing a transparency or shutter retaining means employed in this invention.
Figure 9:
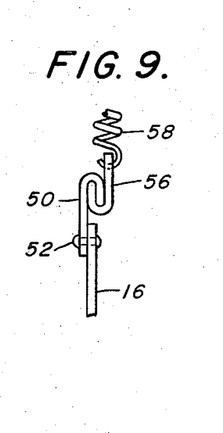
FIG. 9 is a fragmentary cross sectional view of one form of mechanical linkage employed in this invention.

Referring now to FIGS. 8 and 9, the rear view of the shutter-transparency assembly will be considered. It is noted that the shutter 14 is secured in relatively immovable position by any suitable means as by suitable fasteners, adhesive or tape securement directly to the housing. A preferred means would be a structure which permitted adjusting of the shutter position followed by locking of the same. Anchor plates which could be freed to permit shutter positioning and then locked as by bolting would serve the purpose. Five coil springs 58 urge anchoring clip 56, which is engaged with upper anchoring element 50, upwardly. Similarly, lower coil springs 76 have one end secured to lower anchoring clip 70 and the other end secured to the housing. Lower anchoring clip 70 is interengaged with lower anchoring element 66. Cam linking elements 71 serve to connect the lower anchoring clip 70 with the cam arm 72 (not shown in this view). A detailed view of the upper engagement is shown in FIG. 9.

Figure 10:
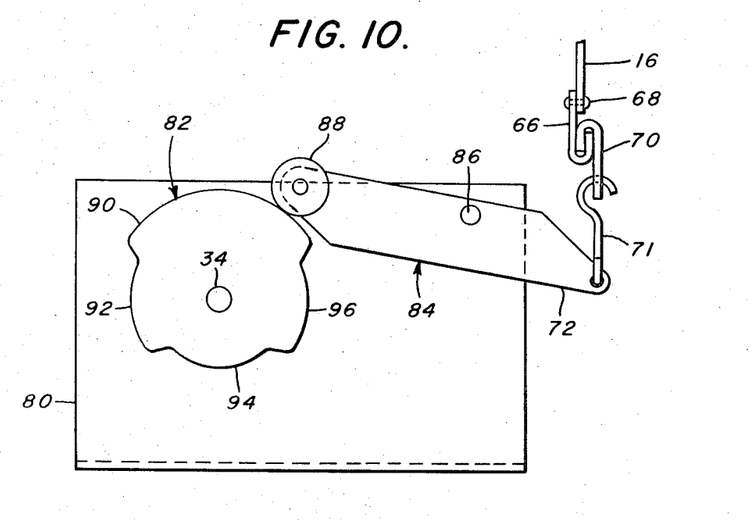
FIG. 10 is an elevational view of one form of cam assembly employed in this invention.

Referring now to FIG. 10, details of one form of cam assembly 20 shown in FIGS. 2 and 3 will be considered. A cam support 80, which may be a metal plate, is secured to the housing by suitable means (not shown). The camshaft 34 passes through the cam support 80 and cam 82 is secured thereto for rotation therewith responsive to rotation created by the motor 30. The cam arm 84 is secured to pivot point 86 and has a cam follower 88 rotatably secured to one end. Secured to the other or free end 72 of cam arm 84 is cam link element 71 which in turn is secured to lower anchoring clip 70. It will be appreciated, therefore, that as cam 82 is rotated by motor 30 through camshaft 34, cam arm 84 will convert the rotary motion into responsive controlled translational movement of transparency 16.

The cam 82 has surfaces 90, 92, 94 and 96 which correspond to desired positions of the transparency 16 and the shutter 14. The form of cam shown has a cycle of A-B-C-B-A. When cam follower 88 is in engagement with cam surface 90, the transparency 16 is in its lowest position. Surface 94 represents the highest transparency position. Surfaces 92, 96 represent the intermediate positions of a three picture transparency. The number of cam surfaces to be provided would vary with transparencies having a different number of pictures.

In connection with the cam means of FIG. 10, generally the mechanical linkage at the bottom and spring tension at the top will provide adequate shutter or transparency retention in registered position. In the event added refinement of adjustment is desired, one may adjust the coil spring tension by moving the housing anchorages of the same, adjust the fixed member of the shutter-transparency combination and/or adjust the cam arm connection to the anchoring means.

A modified form of cam arm structure which permits improved increased adjustability is shown in FIGS. 11, 11a, 11b, 11c and 11d. The cam 82 may be substantially identical with that shown in FIG. 10 and the cam follower 88 functions in the same fashion. The cam arm consists of a first cam arm element 100 and a second cam arm element 102. Both elements 100, 102 are adapted for rotational movement around pivot point 104. It will be appreciated that any adjustment in relative position between cam follower 88 which is mounted on first cam arm element 100 and free end 108 of second cam arm element 102 will produce a responsive modification in alignment between composite transparency 16 and shutter 14. This form of the invention permits fine tuning in order to obtain very precise relative alignment between the shutter 14 and transparency 16.

Figure 11:
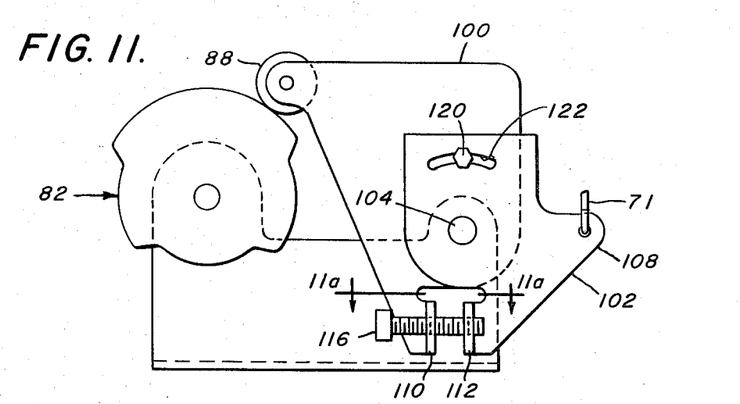
FIG. 11 is an elevational view of a modified form of cam arrangement of this invention.
Figure 11A:
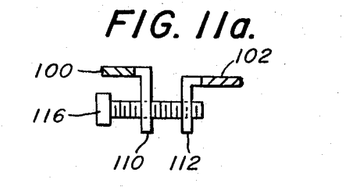
FIG. 11a is a section taken through 11a—11a of FIG. 11 and shows a cam adjusting structure.

As is shown in FIGS. 11 and 11a, cam arm element 100 has a rearwardly directed flange 110 and cam arm element 102 has a rearwardly directed flange 112 which has a threaded aperture generally aligned with a corresponding threaded aperture of flange 110. An adjusting screw 116 is threadedly secured to both flanges 110, 112. By effecting rotation of the adjustment screw in one direction or the other, adjustments of the relative positions of cam arm elements 100, 102 will be obtained. After this has been accomplished, the locking screw 120 which passes through slot 122 of cam arm element 102 and a corresponding opening in element 100 (FIG. 11b) may be tightened to fix the relative positions of elements 100, 102. In this fashion the refined adjustment of the cam arm may be locked in place.

Figure 11B:
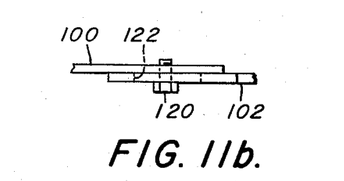
FIG. 11b is a fragmentary cross sectional view showing a cam locking structure.
Figure 11C:
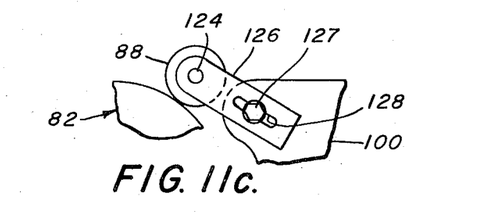
FIG. 11c and 11d illustrate a front elevational view and cross sectional view of a modified cam arm structure which permits adjustment of cam follower position.
Figure 11D:
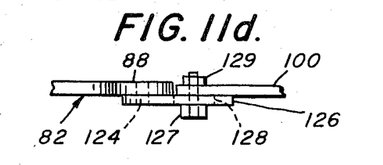

A further modification for improving adjustability may be provided in addition to or in lieu of the adjustable features of FIGS. 11a and 11b. Referring to FIGS. 11c and 11d, there is shown a cam follower 88 which is rotatably secured to support member 126 and rotates about pivot point 124. Support member 126 has an elongated slot 128 which receives a bolt 127. The bolt 127 passes through an opening in first cam arm element 100 and is secured by nut 129. by loosening the bolt 127, support member 126 may be moved with respect to cam arm element 100 and then locked in place. Such movement alters the transparency responsive movement to cam rotation by altering the cam arm structure. Such a feature may also be incorporated in the cam arm 84 of FIG. 10, if desired.

If desired, for convenience, extensions may be provided on the adjustment means shown in FIGS. 11a – 11d to permit adjustment to be effected exteriorly of the housing or closely adjacent the housing walls.

Figure 12:
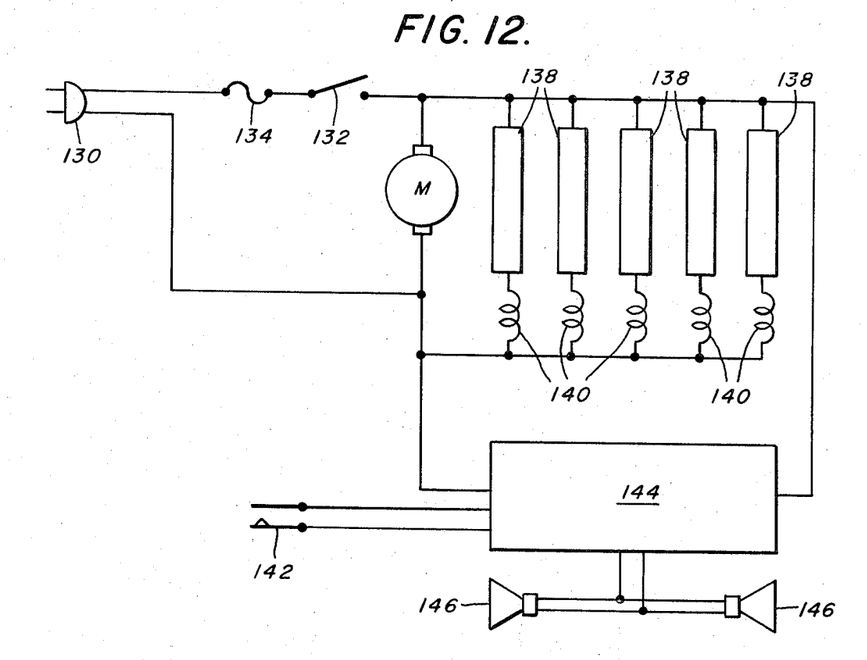
FIG. 12 shows a diagram of a type of electrical circuit employed in the present invention.

FIG. 12 shows a typical schematic circuit diagram for a visual display assembly of this invention. An electrical plug 130 is inserted into a conventional current supply source. On-off switch 132 is employed to energize the assembly, with fuse 134 provided as a safety precaution. A motor M, which will generally have an output of about 1 rpm, is wired into the circuit along with a plurality of electric lamps 138 which in the form shown are fluorescent lamps having suitable ballast 140. For example, the lamps may be five 24-inch 20 watt bulbs provided with 25 watt ballast. Fluorescent lamps are preferred as they give off relatively little heat and will, as a result, not contribute to excessive thermal expansion of the shutter or the transparency. Toward the bottom of the figure is the audio switch 142 which is energized responsive to movement of audio synchronization cam 38 (FIG. 2). This initiates and terminates operation of amplified tape player 144 whose output emerges from speakers 146.

Figure 13:
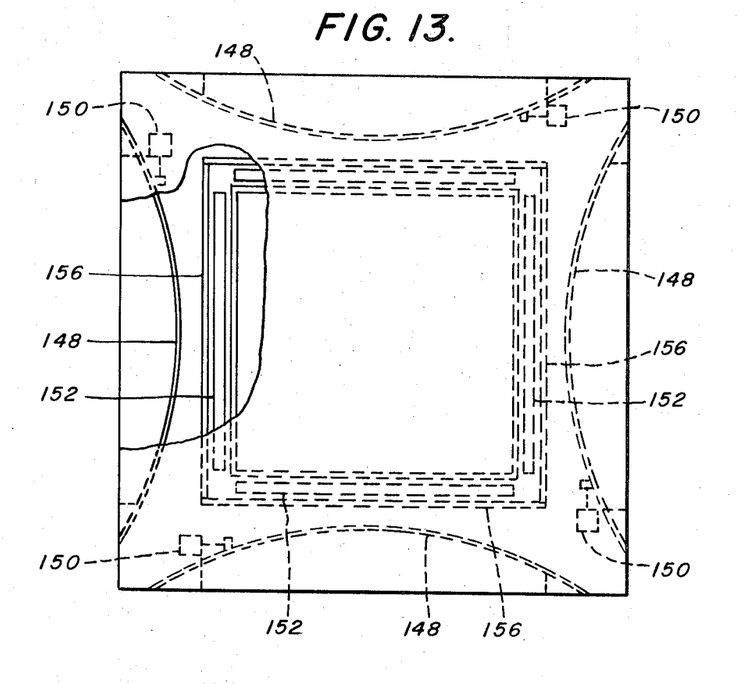
FIG. 13 is a top plan view of a multiple display housing contemplated by this invention.

An advantageous multiple transparency display assembly of this invention is shown in FIG. 13. In the form shown, the housing has a generally rectangular outer periphery with four schematically shown viewing windows 148 which are essentially as described above except for the fact that the curvature occurs in a vertical plane rather than the horizontal plane of the preferred form shown in FIG. 3. Each visual display subsystem is provided with a motor 150 and suitable cam and anchoring means (not shown in this view). A central light source 152 has a group of diffusers 156 surrounding the same in interposed relationship with respect to the viewing windows 148. This form of structure permits display of eight to 24 pictures, employing transparencies having from two to six pictures each. As a result, without occupying substantially greater floor or counter space, a substantially increased multiple over the number of pictures available with one viewing window and one transparency is attained.

Figure 14:
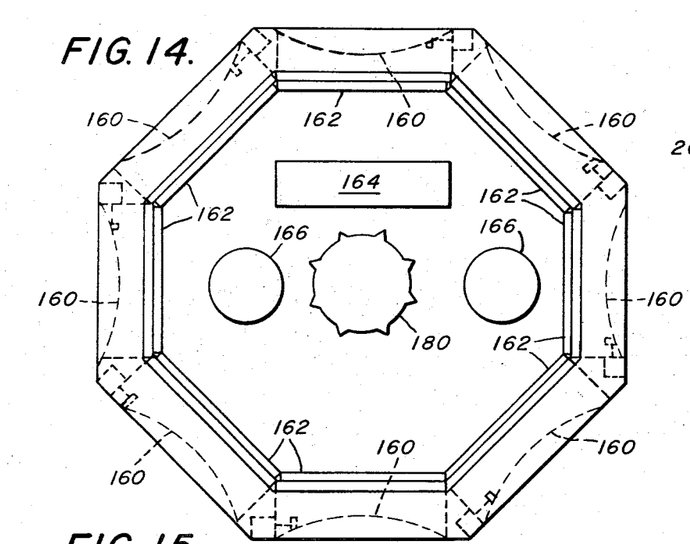
FIG. 14 is a top plan view of a viewer housing assembly having eight display windows.
Figure 15:
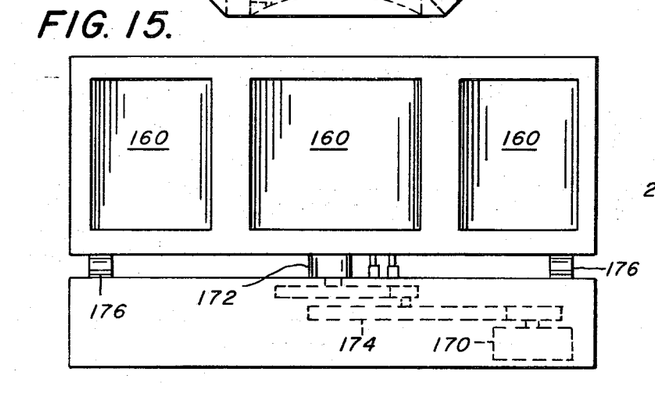
FIG. 15 is a front elevational view of the visual display assembly of FIG. 14.

FIGS. 14 and 15 illustrate another multiple system visual display assembly of this invention. In this form, the viewer assembly is provided with eight viewing windows 160, each of which is provided with an independent visual display subsystem having its own motor, drive means, cam means, anchoring means and a source of diffused light 162. In addition, audio reproduction means 164, including a tape player and amplifier, and speakers 166 are provided. Unlike the form shown in FIG. 13, the upper portion of the housing is adapted to be rotated to permit an individual to remain at one position yet view each of the transparencies. To facilitate such rotation, a drive motor 170 is secured to a drive shaft 172 through suitable speed reducing gears. Supporting rollers 176 are also provided. By means of positioning cam 180, the drive shaft rotation will be converted into rotational movement of the housing followed by stoppage at a predetermined location. Such locations will have the transparencies aligned with the desired display position. Dwell at such locations during the viewing period of the particular transparency is provided by the cam structure 180. Subsequently, the cam initiates further rotation until each window moves to the next succeeding viewing position. This cycle provides for continuous display over a 360° range.

Figures 16, 17:
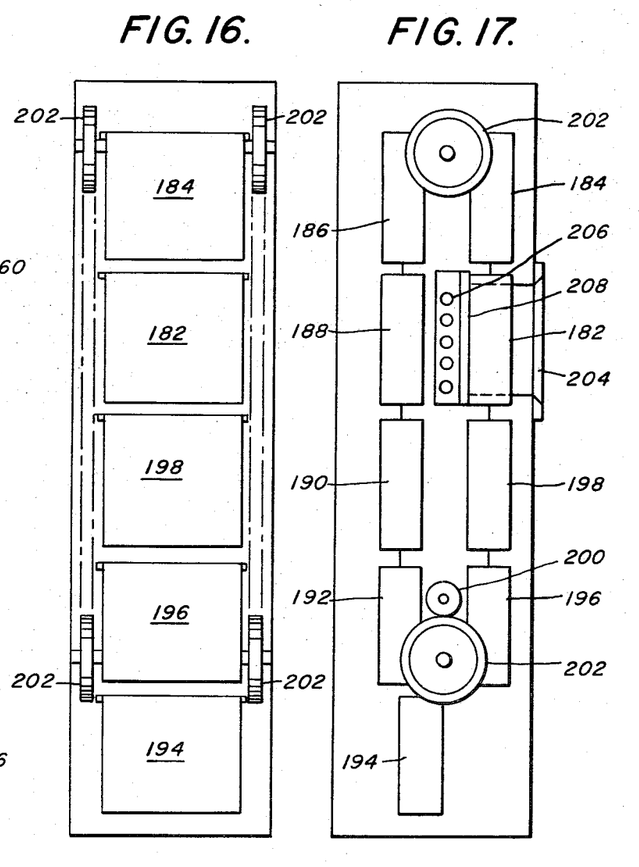
FIGS. 16 and 17 show an endless belt multiple display version of the system of this invention.

Another advantageous embodiment of the invention is illustrated in FIGS. 16 and 17 wherein a plurality of visual display subsystems 182, 184, 186, 188, 190, 192, 194, 196, 198 are joined to provide an endless loop. The loop is operatively associated with a conveyor system which includes a drive motor 200 and a number of sheaves 202. The system, in the form shown, results in the loop moving in a generally vertical direction by viewing window 204 with lamps 206 and diffuser 208 serving to provide a suitable source of diffused light. In this system a person viewing the system may remain at a fixed position and see from 18 to 54 pictures as a result of each transparency having from two to six pictures. If desired, the loop may be mounted for movement in a generally horizontal direction. Also, additional windows may be provided in the housing for increased exposure.

While for convenience of reference herein, the terms "inner," "outer," "upper," "lower" and the like have been employed, it will be appreciated that these recitals are not limiting of the invention. For example, if desired, the structure of FIGS. 1 through 3 may be adapted for relative horizontal movement of the shutter 14 and transparency 16 with suitable anchoring means provided on opposite sides of the element to be moved. Also, the power means and cams may be mounted within the housing above or beside the transparency and shutters in lieu of being mounted below the same. In connection with the multiple window and subsystem type assemblies, it will be appreciated that various numbers of windows and subsystems, various geometric shapes for the housing and various orientations of movement of housing and loops may be provided.

It will, therefore, be appreciated that the visual display assembly of the present invention provides means for effecting precisely controlled, clear display of the individual pictures provided in a composite transparency with such predetermined preciseness as to provide an economical, durable and effective display assembly adapted for a wide range of uses. An additional advantage of the present system is that it facilitates ready and accurate transparency replacement by an unskilled customer or owner of the equipment, thus eliminating the need for the use of skilled or semi-skilled technical people. Such systems are further adapted for use with multiple viewing display subsystems which effect a substantial increase in the number of pictures which may be displayed within a single housing.

As a further advantage of the present assembly, means are provided for coordinated audio presentations which may, if desired, be precisely mechanically synchronized with the visual sequential presentation of the pictures. Numerous unique features including the window, shutter and transparency curvature which facilitates intimate registered secured relative positions, the relative height of the transparency stripes as compared to the shutter stripes, the precise mechanical drive means including the cam structures, such as the adjustable two-piece cam arm, and the economical unitized visual subsystems all contribute to these advantageous features of the present invention.

Whereas particular embodiments of the invention have been described above for purpose of illustration, it will be evident to those skilled in the art that numerous variations of the details may be made without departing from the invention as defined in the appended claims.

It is claimed:

1. An illuminated visual display assembly comprising
   a housing having a display opening,
   a transparent display window secured within or adjacent said display opening,
   said display window being curved with a concave surface facing the exterior of said housing and a convex surface facing the housing interior,
   a composite transparency having at least two pictures with each picture being fragmented into a plurality of stripe-like picture segments of substantially uniform height disposed in spaced relationship with respect to each other, but disposed in abutting alternating relationship with respect to picture segments of at least one other picture,
   a shutter member having generally parallel spaced darkened sections which resist picture display and generally parallel spaced transparent sections which permit picture display,
   said stripe-like picture segments of said transparency having a height greater than the height of said transparent sections of said shutter,
   said transparency and said shutter disposed in intimate face to face contact adjacent said display window in relative registered position to permit sequential display of said fragmented transparency pictures through said display window,
   drive means for establishing relative movement between said shutter and said transparency while retaining said intimate surface to surface contact therebetween to provide sequential display of said pictures with a predetermined dwell period for displaying said transparency pictures,
   light source means disposed rearwardly of said shutter and said transparency, and
   said drive means including a motor and at least one cam and cam follower operatively associated with one of said shutter and said transparency, whereby operation of said motor will effect relative movement between said shutter and said transparency.

2. The visual display assembly of claim 1 including
   said stripe-like picture segments have a height of about 15 to 60 percent greater than the height of said shutter transparent sections, and
   the spacing between two adjacent transparent sections of said shutter being greater than the spacing between two adjacent stripe-like picture segments of the same picture on said transparency.

3. The visual display assembly of claim 1 including
   a diffuser disposed between said light source and the closer of said shutter and said transparency.

4. An illuminated visual display assembly comprising
   a housing having a display opening,
   a transparent display window secured within or adjacent said display opening,
   a composite transparency having at least two pictures with each picture being fragmented into a plurality of stripe-like picture segments of substantially uniform height disposed in spaced relationship with respect to each other, but disposed in abutting alternating relationship with respect to picture segments of at least one other picture,
   a shutter member having generally parallel spaced darkened sections which resist picture display and generally parallel spaced transparent sections which permit picture display,
   said stripe-like picture segments of said transparency having a height greater than the height of said transparent sections of said shutter,
   said transparency and said shutter disposed in intimate face to face contacts adjacent said display window in relative registered position to permit sequential display of said fragmented transparency pictures through said display window,
   drive means for establishing relative movment between said shutter and said transparency while retaining said intimate surface to surface contact therebetween to provide sequential display of said pictures with a predetermined dwell period for displaying said transparency pictures,
   light source means disposed rearwardly of said shutter and said transparency,
   said drive means including a motor and at least one cam and cam follower operatively associated with one of said shutter and said transparency, whereby operation of said motor will effect relative movement between said shutter and said transparency,
   at least one rotating cam secured to a camshaft driven by said motor,
   a cam follower in contact with the surface of said cam and rotatably mounted on a cam arm,
   upper and lower anchoring means secured to one of a movable said transparency and a movable said shutter,
   said cam arm connected to said upper or lower anchoring means, whereby rotation of said cam will establish precisely controlled responsive movement of said upper or lower anchoring means and said transparency or said shutter to provide clear independent sequential display of each said transparency picture,
   said upper anchoring means including a first generally J-shaped elongated member secured to the upper end of one of said shutter and transparency, a second generally J-shaped elongated member interengaged with said first generally J-shaped elongated member and a number of coil springs having one end secured to said housing and a second end secured to said second generally J-shaped member, and
   said lower anchoring means including a third generally J-shaped elongated member secured to the lower end of said shutter or transparency to which said upper anchoring means is secured, a fourth generally J-shaped elongated member interengaged with said third generally J-shaped elongated member, a number of coil springs having one end secured to said housing and a second end secured to said fourth generally J-shaped member and at least one connecting element connecting said fourth generally J-shaped elongated element and said rotatable cam arm.

5. The visual display assembly of claim 4 including
said shutter being fixed and disposed intermediate said display window and said transparency, and
said transparency being movable and having said upper and lower anchoring means secured thereto.

6. The visual display assembly of claim 4 including
said rotatable cam arm having a first element supporting said cam follower and a second element pivoted about the same point as said first element secured to said anchoring means, and
adjustment means for altering the relative position of said cam arm first element with respect to said cam arm second element.

7. The visual display assembly of claim 6 including
said adjustment means being an element threadedly secured to said first and second cam arm elements, whereby rotation of said element will establish relative rotational movement between said first and second cam arm elements about the common pivot point.

8. The visual display assembly of claim 6 including
locking means for securing said first and second elements in fixed adjusted relative position.

9. The visual display assembly of claim 4 including
a pair of said cams secured in relative spaced position on said camshaft,
a said cam arm operatively associated with each said cam,
a said cam follower secured to each said cam arm operatively associated with each said cam, and
each said cam arm operatively associated with said anchoring means.

10. The visual display assembly of claim 4 including
said cam arm having a cam arm extension to which said cam follower is rotatably secured, and
cam follower adjusting means for adjusting the position of said cam arm extension with respect to said cam arm, whereby an alteration in the amount of movement of said shutter or said transparency responsive to movement of said cam follower may be effected.

* * * * *

UNITED STATES PATENT OFFICE
CERTIFICATE OF CORRECTION

Patent No. 3,862,504　　　　　　Dated January 28, 1975

Inventor(s)　Harry M. Ringelheim, deceased, et al

It is certified that error appears in the above-identified patent and that said Letters Patent are hereby corrected as shown below:

| | |
|---|---|
| Item 76, entitled "Inventors" | Change "P. O. Box 1016, Pittsburgh, Pa. 99574" to --728 Fifth Avenue, Pittsburgh, Pa. 15219-- |
| Column 3, Line 17 | Begin new paragraph at word "It" |
| Column 4, Line 45 | Change "a" to --at-- |
| Column 7, Line 50 | Change "facilitages" to --facilitates-- |
| Column 9, Line 11 | Change "by" to --By-- |
| Column 12, Line 22 | Change "contacts" to --contact-- |

Signed and sealed this 15th day of April 1975.

(SEAL)
Attest:

RUTH C. MASON
Attesting Officer

C. MARSHALL DANN
Commissioner of Patents
and Trademarks